United States Patent
Kent

Patent Number: 6,059,642
Date of Patent: May 9, 2000

[54] APPARATUS FOR GRINDING A SHANK OF A DRILL BIT

[75] Inventor: Donald Byron Kent, Lloydminister, Canada

[73] Assignee: Iron Horse Tools Inc., Lloydminister, Canada

[21] Appl. No.: 09/163,487

[22] Filed: Sep. 30, 1998

[30] Foreign Application Priority Data

Jul. 10, 1998 [CA] Canada .................................. 2242907

[51] Int. Cl.⁷ ..................................................... B24B 7/00
[52] U.S. Cl. .......................... 451/232; 451/48; 451/386; 279/114
[58] Field of Search ............................... 451/48, 49, 231, 451/232, 386, 375; 279/114

[56] References Cited

U.S. PATENT DOCUMENTS

| | | |
|---|---|---|
| 1,002,068 | 8/1911 | Martz . |
| 3,049,737 | 8/1962 | Weibel . |
| 4,612,731 | 9/1986 | Eckel .......................................... 51/56 |
| 5,007,204 | 4/1991 | Ibe et al. . |
| 5,466,100 | 11/1995 | Ahluwalia ................................ 408/224 |

*Primary Examiner*—Timothy V. Eley
*Assistant Examiner*—Willie Berry, Jr.
*Attorney, Agent, or Firm*—Davis and Bujold

[57] ABSTRACT

An apparatus for grinding a shank of a drill bit includes a base and several movable jaws supported by the base, that are movable toward each other and away from each other. A support ring is rotatably secured to the base, which has a central opening that encircles the movable jaws. A laterally adjustable grinding wheel support is secured to the support ring. Incremental rotation of the support ring results in incremental orbital movement of the grinding wheel support relative to the movable jaws. Lateral adjustment of the grinding wheel support moves the grinding wheel support toward and away from the movable jaws.

21 Claims, 5 Drawing Sheets

APPARATUS FOR GRINDING A SHANK OF A DRILL BIT

FIELD OF THE INVENTION

The present invention relates to an apparatus for grinding a shank of a drill bit.

BACKGROUND OF THE INVENTION

When in use, a shank of a drill bit is clamped within a chuck of a drill. A tip of the drill bit extends beyond the chuck to engage a workpiece into which a hole is being drilled. As the chuck of the drill rotates it imparts a rotary motion to the drill bit, causing the tip of the drill bit to engage the workpiece. Most drill bits are manufactured with cylindrical shanks that are circular in cross-section. Should the resistance provided by the workpiece at the tip of the drill bit exceed the clamping force exerted upon the cylindrical shank, the shank of the drill bit will rotate in the chuck.

In order to prevent rotation of the shank of the drill bit within the chuck, manufacturers such as Viking Drill & Tool Ltd. of St. Paul, Minn., and American Tool Co. Inc. of Willmington, Iowa are manufacturing "tri-shank" drill bits that have three flat areas that assist in avoiding rotation of the shank within the chuck. The number of flat areas need not be limited to three. U.S. Pat. No. 5,466,100 illustrates a drill bit with a hexagonal shank.

The same result can be obtained by using a grinder to create flat areas along the shank of a cylindrical drill bit. For the best results, it is preferred that there be three or more flat areas. Unfortunately, there does not presently exist an apparatus that is particular adapted to permit an average person to grind a shank of a drill bit.

SUMMARY OF THE INVENTION

What is required is an apparatus for grinding a shank of a drill bit.

According to the present invention there is provided an apparatus for grinding a shank of a drill bit which includes a base and several movable jaws supported by the base, that are movable toward each other and away from each other. A support ring is rotatably secured to the base, which has a central opening that encircles the movable jaws. A laterally adjustable grinding wheel support is secured to the support ring. Incremental rotation of the support ring results in incremental orbital movement of the grinding wheel support relative to the movable jaws. Lateral adjustment of the grinding wheel support moves the grinding wheel support toward and away from the movable jaws.

The apparatus, as described above, permits lateral adjustment of the grinding wheel support to move the grinding wheel toward the drill bit to a position where it can grind a flat portion to a selected depth on a shank of the drill bit. The grinding wheel support is mounted to the support ring, which is positioned around the movable jaws that hold a drill bit. By incrementally rotating the support ring, a selected number of flat portions can be placed on the shank of the drill bit. It is preferred that at least three flat portions be provided on each drill bit shank.

Although beneficial results may be obtained through the use of the apparatus for grinding a shank of a drill bit, as described above, it is desirable to have a simple manner of adjusting the positioning of the jaws. Even more beneficial results may, therefore, be obtained when the base includes an inner barrel and an outer barrel. The jaws are engaged in guides in the outer barrel, while being mounted to the inner barrel. Relative rotation of the inner barrel and outer barrel results in movement of the jaws along the guides whereby the jaws are movable toward each other and move away from each other.

Although beneficial results may be obtained through the use of the apparatus for grinding a shank of a drill bit, as described above, it is desirable to have as rapid a means of adjustment as possible. Even more beneficial results may, therefore, be obtained when the inner barrel has hand grips by means of which the inner barrel is rotated. Rotation of the inner barrel in a first direction moves the jaws toward each other. Rotation of the inner barrel in a second direction moves the jaws away from each other.

There are a variety of ways in which to have the jaws engage the outer barrel. Beneficial results have been obtained when the guides in the outer barrel are arcuate slots and the jaws have projecting pins which are engaged in the arcuate slots.

Although beneficial results may be obtained through the use of the apparatus for grinding a shank of a drill bit, as described above, it is desirable to lock the inner barrel in a selected rotational position relative to the outer barrel. Even more beneficial results may, therefore, be obtained when a locking bar is provided. At least one of the hand grips have a locking lever that engages the locking bar to maintain the inner barrel in a selected rotational position. When two hand grips are provided, each of which has a locking lever, it is preferred that a connecting line be provided to tie the movement of the locking levers.

Although beneficial result may be obtained through the use of the apparatus for grinding a shank of a drill bit, as described above, it is desirable that the support ring also be maintained in a selected rotational position. Even more beneficial results may, therefore, be obtained when a detente locking system is positioned between the support ring and the base, thereby maintaining the support ring in a selected rotational position.

Although beneficial results may be obtained through the use of the apparatus for grinding a shank of a drill bit, as described above, the correct positioning of the support ring is critical to the correct positioning of the flat portions on the shank of the drill bit. Even more beneficial results may, therefore, be obtained when the base has a top on which is marked indicia to aid in selection of a rotational position for the support ring, and the support ring has marked thereon cooperating indicia.

Although beneficial result may be obtained through the use of the apparatus for grinding a shank of a drill bit, as described above, the structure for laterally adjusting the grinding wheel support must be simple and effective. Even more beneficial results may, therefore, be obtained when the laterally adjustable grinding wheel support includes a mounting arm having a first end and a second end. An upwardly projecting pin is positioned between the first end and the second end. This upwardly projecting pin is used to support a grinding wheel which is rotated by a hand drill. The first end of the mounting arm is pivotally mounted to the support ring. The second end is secured in a guide track on the support ring. Movement of the second end of the mounting arm along the guide track, moves the upwardly projecting pin toward and away from the movable jaws.

Although beneficial results may be obtained through the use of the apparatus for grinding a shank of a drill bit, as described above, it is desirable that the adjustment be capable of being made rapidly. Even more beneficial results may, therefore, be obtained when a rod is secured to the second end of the mounting arm. Gearing is provided to extend and retract the rod, thereby moving the second end of the mounting arm along the guide track.

Although beneficial results may be obtained through the use of the apparatus for grinding a shank of a drill bit, as described above, it is desirable to ensure that the base does not move during use. Even more beneficial results may, therefore, be obtained when the base has a reinforced lower portion, such that the base is adapted to be clamped in a vice.

Although beneficial results may be obtained through the use of the apparatus for grinding shank of a drill bit, as described above, it is important that the apparatus does not present a hazard to the user. Even more beneficial results may, therefore, be obtained when a shield is positioned around a portion of the grinding wheel support.

Although beneficial results may be obtained through the use of the apparatus for grinding a shank of a drill bit, as described above, cuttings tend to accumulate within the shield. Even more beneficial results may, therefore, be obtained when the shield includes a cuttings disposal passage.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
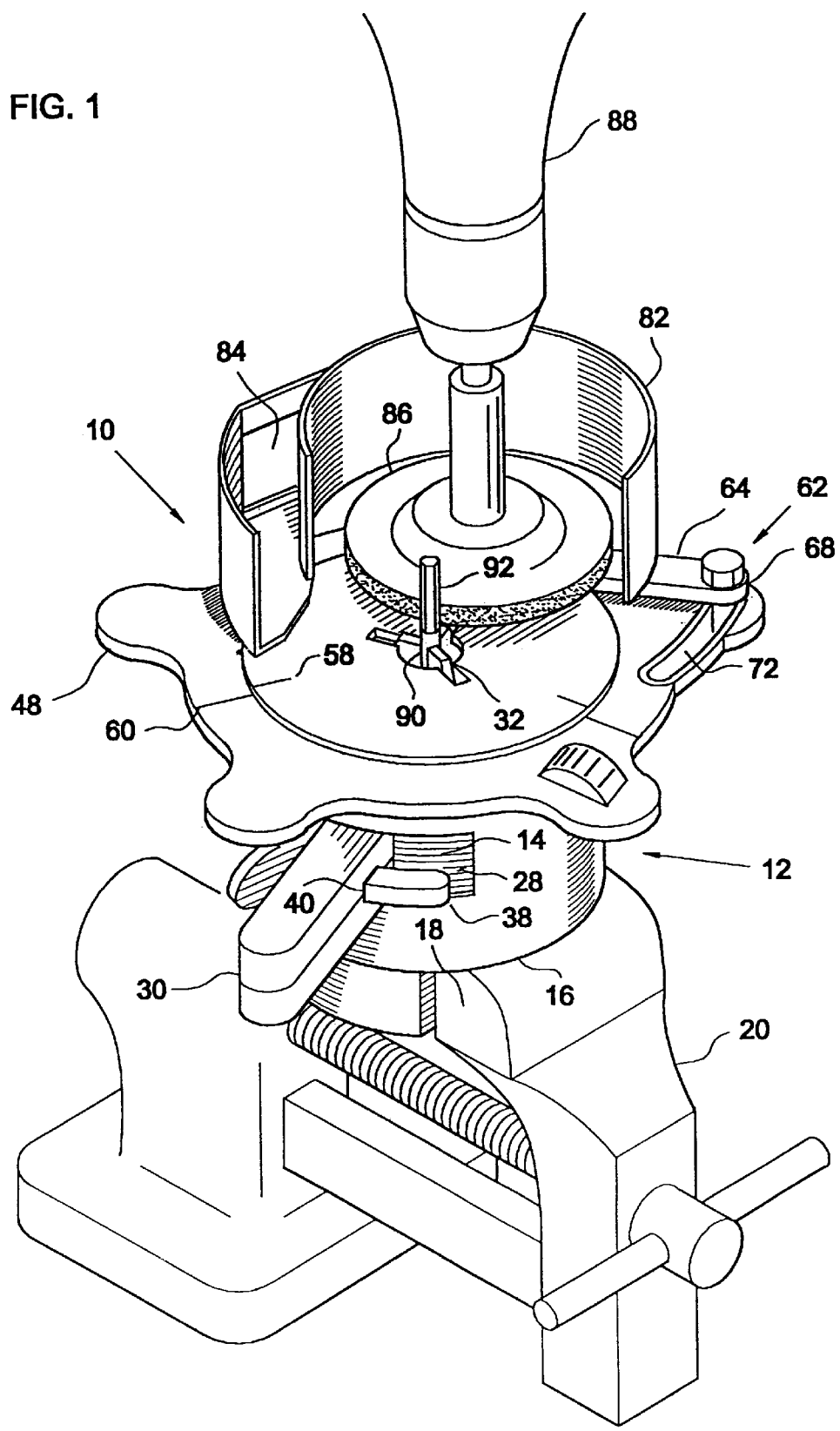
FIG. 1 is perspective view of an apparatus for grinding a shank of a drill bit constructed in accordance with the teachings of the present invention.

The preferred embodiment, an apparatus for grinding a shank of a drill bit generally identified by reference numeral 10, will now be described with reference to FIGS. 1 through 5.

Figure 2:
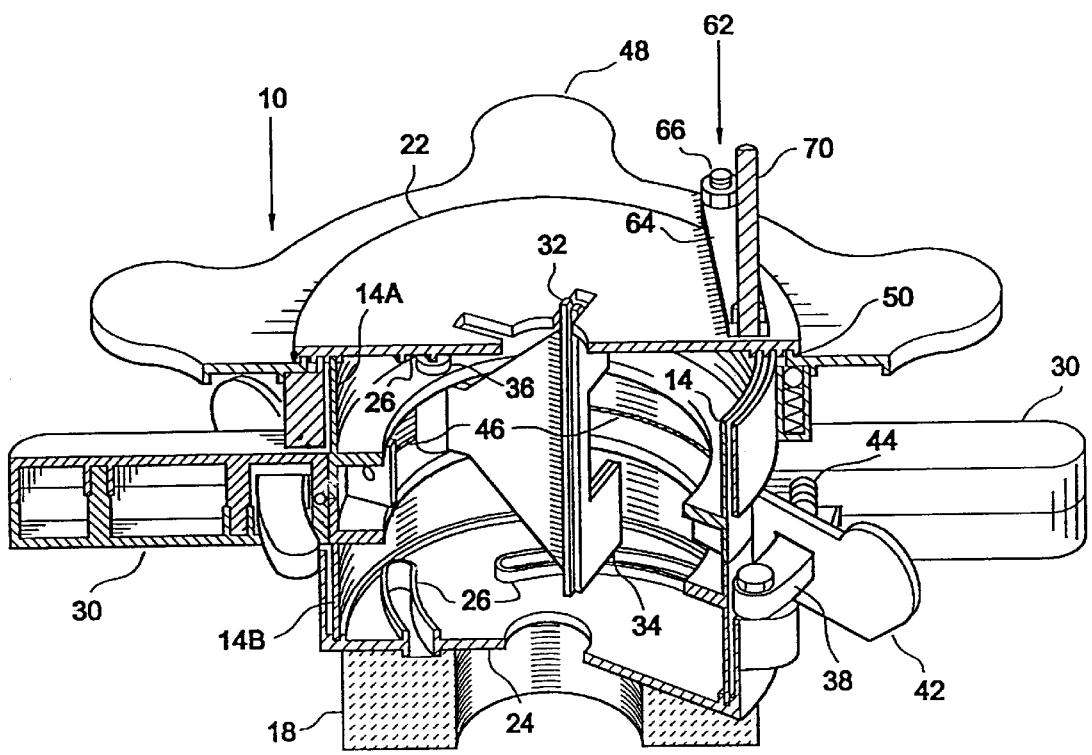
FIG. 2 is cut away perspective view of the apparatus for grinding a shank of a drill bit illustrated in FIG. 1.
Figure 2:
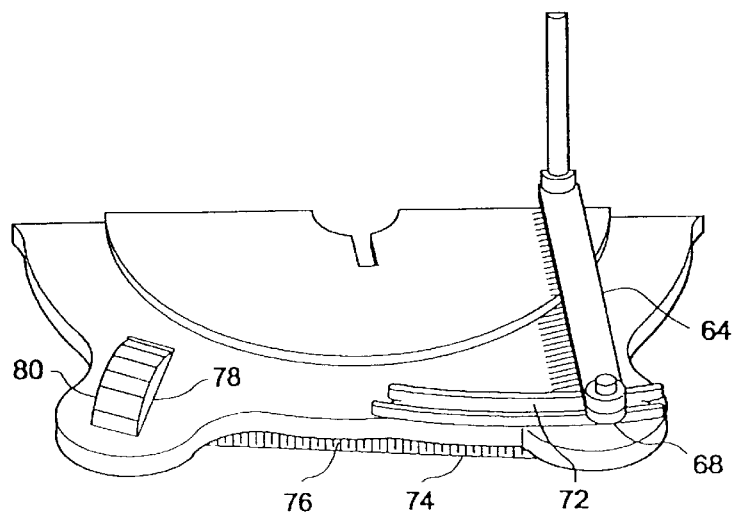
Figure 3:
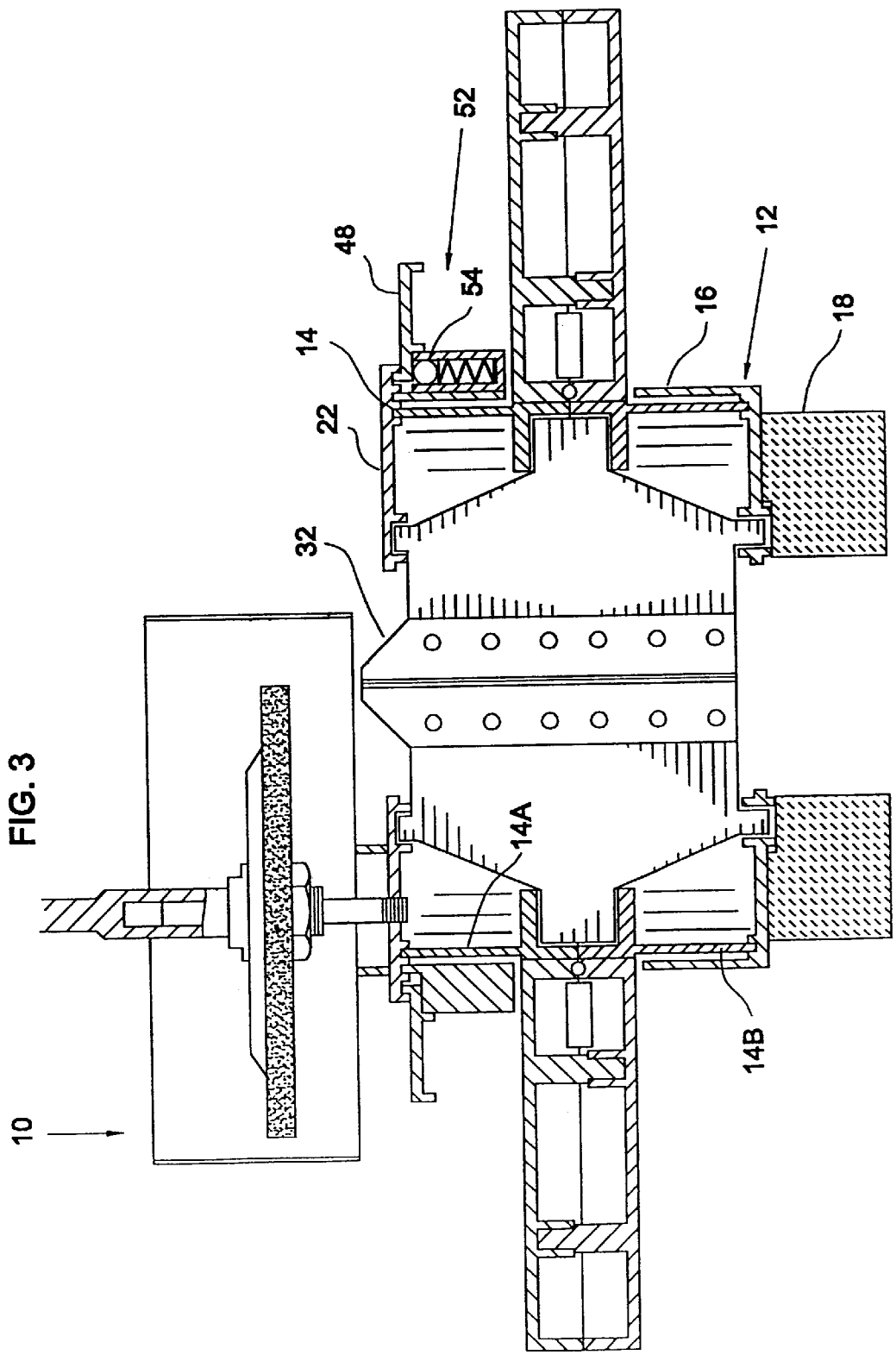
FIG. 3 is side elevation view, in section, of the apparatus for grinding a shank of a drill bit illustrated in FIG. 1.
Figure 4:
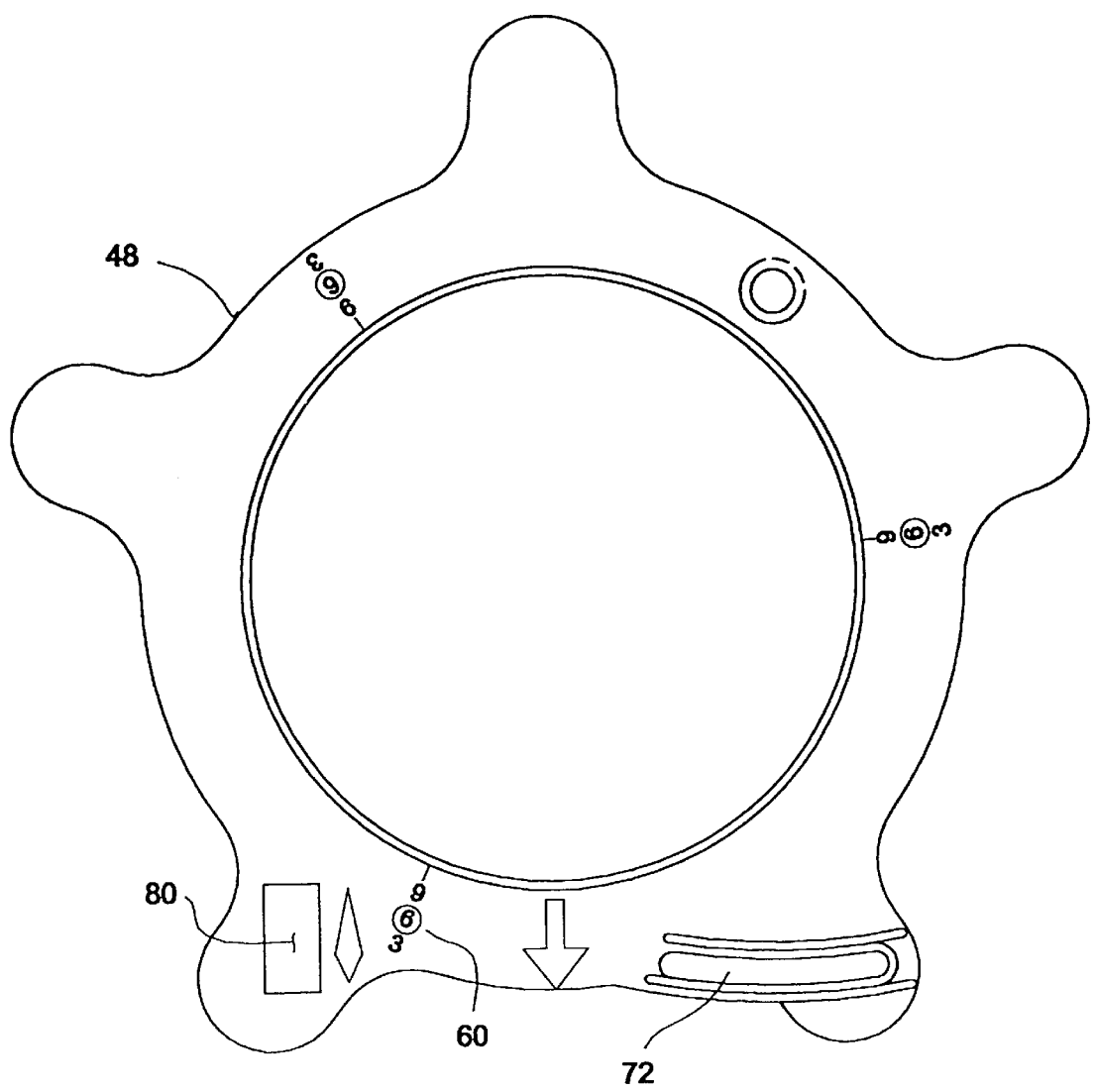
FIG. 4 is a top plan view of a support ring for the apparatus illustrated in FIG. 1.
Figure 5:
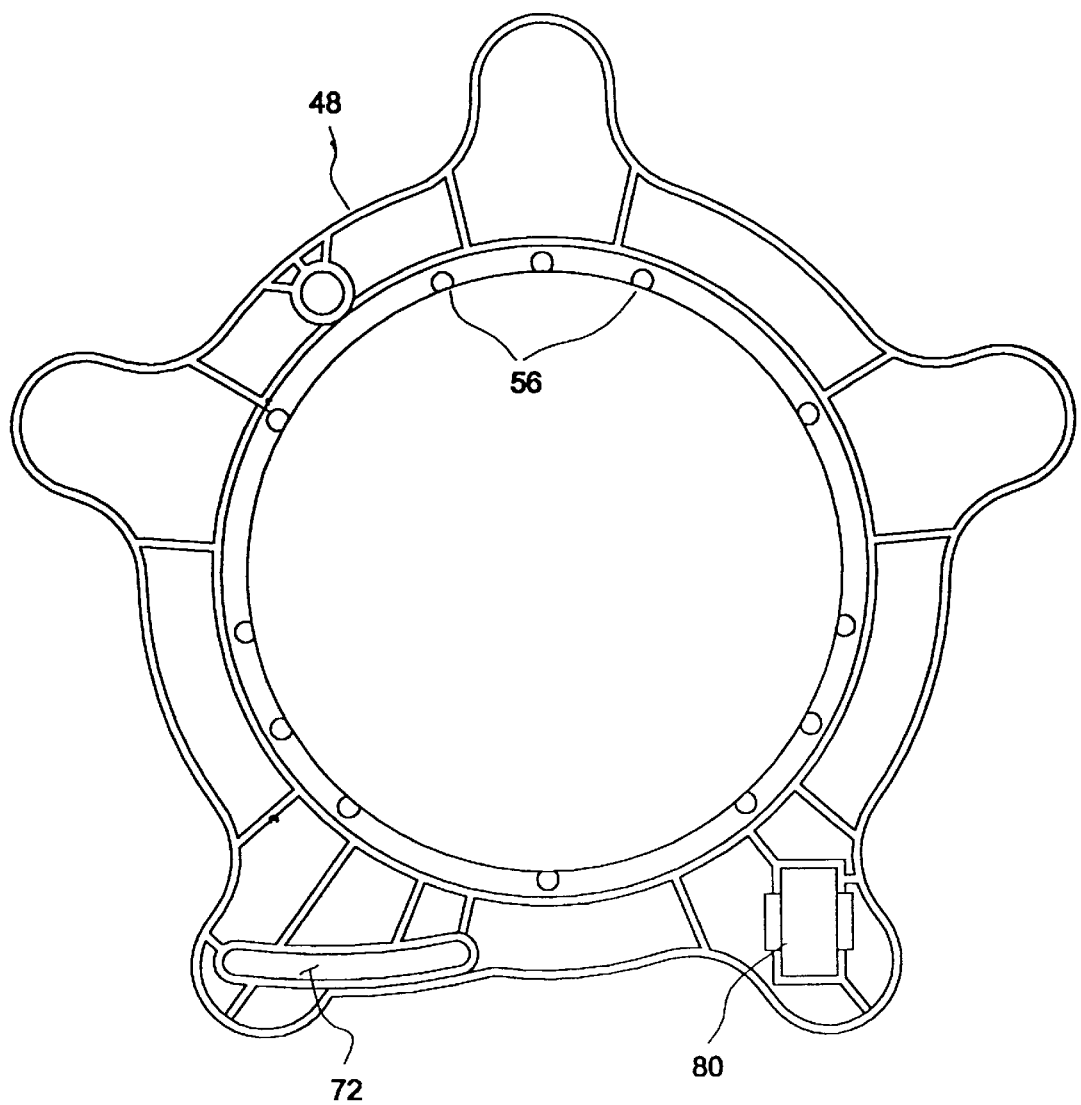
FIG. 5 is a bottom plan view of a grinding wheel support for the apparatus illustrated in FIG. 1.

Referring to FIG. 1, apparatus 10 includes a base generally indicated by reference numeral 12. Base 12 includes an inner barrel 14 and an outer barrel 16. Base has a reinforced lower portion 18. Reinforced lower portion 18 is intended to be securely clamped into a vice 20. Referring to FIG. 2, outer barrel 16 has a top 22 and a bottom 24. Both top 22 and bottom 24 have arcuate slots 26 which serve as guides, as will hereinafter be further described. Referring to FIG. 1, outer barrel 16 has sidewall openings 28. Referring to FIG. 2, for ease of assembly, as will hereinafter be further described, inner barrel 14 comes in to sections a top section 14a and a bottom section 14b which are secured together. Referring to FIG. 1, inner barrel 14 has a pair of hand grips 30 which extend through sidewall openings 28 in outer barrel 16. Several movable jaws 32 are supported by base 12. Referring to FIG. 2, jaws 32 have projecting pins 34 which are engaged in arcuate slots 26 in top 22 and bottom 24 of outer barrel. Jaws 32 are also pivotally secured by pins 36 to inner barrel 14. Inner barrel 14 is made with a top section 14a and a bottom section 14b, to enable inner barrel to engage pins 36. By virtue of the pivotal connection with pin 36, jaws must move with inner barrel 14. Rotation of inner barrel 14 by means of hand grips 30 in a first direction moves jaws 32 along arcuate slots 26 toward each other. Rotation of inner barrel 14 by means of hand grips 30 in a second direction moves jaws 32 along arcuate slots 26 away from each other. Referring to FIG. 1, locking bars 38 extend across sidewall openings 28 in outer barrel 16. Locking bars 38 extend through slots 40 in hand grips 30. Referring to FIG. 2, each of hand grips 30 has a locking lever 42. Biasing springs 44 force locking levers 42 into engagement with locking bars 38 to maintain inner barrel 14 in a selected rotational position. A connecting line 46 ties the movement of the respective locking levers 42 on the two hand grips 30. Referring to FIG. 1, a support ring 48 is rotatably secured to base 12. Support ring 48 has a central opening 50 that encircles movable jaws 32. Referring to FIG. 3, a ball and detente locking system generally indicated by reference numeral 52 is positioned between support ring 48 and base 12, whereby support ring 48 is maintained in a selected rotational position. A ball which forms part of ball and detente locking system 52 is identified by reference numeral 5,. Referring to FIG. 5, a plurality of detentes 56 are shown which illustrate rotational positions. Referring to FIGS. 1 and 2, indicia 58 are marked on top 22 of outer barrel 16 to aid in selection of a rotational position for support ring 48. Support ring 48 has marked thereon cooperating indicia 60. A laterally adjustable grinding wheel support, generally indicated by reference numeral 62 is secured to support ring 48. Incremental rotation of support ring 48 results in incremental orbital movement of grinding wheel support 62 relative to movable jaws 32. Laterally adjustable grinding wheel support 62 includes a mounting arm 64 having a first end 66 and a second end 68. An upwardly projecting pin 70 is positioned between first end 66 and second end 68. First end 66 is pivotally mounted to support ring 48. Second end 68 is secured to a guide slot 72 on support ring 48. A rod 74 is secured to second end 68 of mounting arm 64. Rod 74 has a gear profile 76 when engages a thumb gear 78 positioned in an opening 80 in support ring 48. Rotation of the thumb gear 78 serves to extend and retract rod 74, thereby moving second end 68 of mounting arm 64 along guide slot 72. Movement of second end 68 of mounting arm 64 along guide slot 72 results in movement of upwardly projecting pin 70 toward and away from movable jaws 32. Referring to FIG. 1, a shield 82 is positioned around a portion of the grinding wheel support 62. Shield 82 includes a cuttings disposal passage 84.

The use and operation of apparatus 10 will now be described with reference to FIGS. 1 through 5. Referring to FIG. 1, apparatus 10 is shown in combination with a grinding wheel 86 rotated by a hand drill 88. Grinding wheel 86 is supported on the upwardly projecting pin 70. Prior to use reinforced lower portion 18 is intended to be securely clamped into a vice 20. A force is exerted upon locking levers 42 to overcome the biasing force exerted by springs 44 and release locking levers 42 from their locking engagement with locking bars 38. Hand grips 30 are then used to rotate inner barrel 14 in a second direction so that jaws 32 move away from each other. A drill bit 90 is positioned between movable jaws 32 with a shank 92 of drill bit 90 exposed. Handles 30 are then used to rotate inner barrel 14 in a first direction so that jaws 32 move toward each other to engage drill bit 90. As inner barrel 14 is rotated in the first direction, locking levers 42 are released. Biasing springs 44 force locking levers 42 into engagement with locking bars 38, thereby locking inner barrel 14 in the selected rotational position. Thumb gear 78 is then rotated to retract rod 74 thereby moving second end 68 of mounting arm 64 to bring upwardly projecting pin 70 toward from movable jaws 32. As grinding wheel 86 is supported on upwardly projecting pin 70, this brings grinding wheel 86 into contact with shank 92 of drill bit 90. Grinding wheel is then rotated rapidly by hand drill 88. Support ring 48 is then rotated sequentially to the desired rotational positions to grind a desired number of flat portions onto shank 92. This is done by matching indicia 58 on top 22 with indicia 60 on support ring 48. The preferred indicia includes 3 positions for making three flat areas on a drill bit shank, 6 positions for making six flat areas on a drill bit shank, and 9 positions for making nine flat areas on a drill bit shank. It has been found that a drill bit with nine flat portions performs the best. The reason for this, is that the chuck of a drill is able to grip a drill bit with nine flat portions without the need for manual adjustment. Once shank 92 of drill bit 90 has the desired number of flat portions, drill bit 90 is released from jaws 32 by exerting a force upon locking levers 42 to overcome the biasing force exerted by springs 44 and release locking levers 42 from their locking engagement with locking bars 38. One of locking levers 42 is maintained in a depressed condition which maintains inner barrel 14 free to rotate due to connecting line 46 which ties the movement of locking levers 42. Using a free hand, drill bit 90 is grasped in preparation for removal so it does not drop down into base 12. Hand grips 30 are then used to rotate inner barrel 14 in a second direction so that jaws 32 move away from each other, releasing drill bit 90.

It will be apparent to one skilled in the art that apparatus 10 provides a safe and efficient means for making flat portions on a shank of a drill bit. It will also be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for grinding a shank of a drill bit, comprising:
   a base;
   several movable jaws supported by the base, the jaws being movable toward each other and away from each other;
   a support ring rotatably secured to the base, the support ring having a central opening that encircles the movable jaws;
   a laterally adjustable grinding wheel support secured to the support ring, such that incremental rotation of the support ring results in incremental orbital movement of the grinding wheel support relative to the movable jaws and lateral adjustment of the grinding wheel support moves the grinding wheel support toward and away from the movable jaws.

2. The apparatus for grinding a shank of a drill bit as defined in claim 1, wherein the base includes an inner barrel and an outer barrel, the jaws engaging guides in the outer barrel, the jaws being mounted to the inner barrel, relative rotation of the inner barrel and outer barrel resulting in movement of the jaws along the guides whereby the jaws are movable toward each other and move away from each other.

3. The apparatus for grinding a shank of a drill bit as defined in claim 2, wherein the inner barrel has at least one hand grip by means of which the inner barrel is rotated, rotation of the inner barrel in a first direction moves the jaws toward each other and rotation of the inner barrel in a second direction moves the jaws away from each other.

4. The apparatus for grinding a shank of a drill bit as defined in claim 3, wherein at least one locking bar is provided, the at least one hand grip having a locking lever that engages the at least one locking bar to maintain the inner barrel in a selected rotational position.

5. The apparatus for grinding a shank of a drill bit as defined in claim 4, wherein two hand grips are provided each of the hand grips having a locking lever, a connecting line tying the movement of the locking levers.

6. The apparatus for grinding a shank of a drill bit as defined in claim 2, wherein the guides in the outer barrel are arcuate slots and the jaws have projecting pins which are engaged in the arcuate slots.

7. The apparatus for grinding a shank of a drill bit as defined in claim 1, wherein the laterally adjustable grinding wheel support includes a mounting arm having a first end and a second end, an upwardly projecting pin being positioned between the first end and the second end, the first end being pivotally mounted to the support ring, the second end being secured in a guide track on the support ring, movement of the second end of the mounting arm along the guide track moving the upwardly projecting pin toward and away from the movable jaws.

8. The apparatus for grinding a shank of a drill bit as defined in claim 7, a rod being secured to the second end of the mounting arm, gearing being provided to extend and retract the rod, thereby moving the second end of the mounting arm along the guide track.

9. The apparatus for grinding a shank of a drill bit as defined in claim 7, in combination with a grinding wheel rotated by a hand drill, the grinding wheel supported on the upwardly projecting pin.

10. The apparatus for grinding a shank of a drill bit as defined in claim 7, wherein the base has a top on which is marked indicia to aid in selection of a rotational position for the support ring, and the support ring has marked thereon cooperating indicia.

11. The apparatus for grinding a shank of a drill bit as defined in claim 1, the base having a reinforced lower portion, such that the base is adapted to be clamped in a vice.

12. The apparatus for grinding a shank of a drill bit as defined in claim 1, wherein a detente locking system is positioned between the support ring and the base, thereby maintaining the support ring in a selected rotational position.

13. The apparatus for grinding a shank of a drill bit as defined in claim 1, wherein a shield is positioned around a portion of the grinding wheel support.

14. The apparatus for grinding a shank of a drill bit as defined in claim 13, wherein the shield includes a cuttings disposal passage.

15. An apparatus for grinding a shank of a drill bit, comprising:
   a base including an inner barrel, an outer barrel and a reinforced lower portion such that the base is adapted to be secured in a vice by clamping onto the reinforced lower portion, the outer barrel having a top, a bottom, and sidewall openings, the top and the bottom having arcuate guides, the inner barrel having a pair of hand grips that extend through the sidewall openings in the outer barrel;
   several movable jaws supported by the base, the jaws engaging guides in the outer barrel and being pivotally mounted to the inner barrel, such that rotation of the inner barrel by means of the hand grips in a first direction moves the jaws toward each other and rotation of the inner barrel by means of the hand grips in a second direction moves the jaws away from each other;

locking bars extending across the sidewall openings in the outer barrel, each of the hand grips having a locking lever that engages the locking bars to maintain the inner barrel in a selected rotational position;

a support ring rotatably secured to the base, the support ring having a central opening that encircles the movable jaws;

a ball and detente locking system between the support ring and the base, whereby the support ring is maintained in a selected rotational position;

a laterally adjustable grinding wheel support secured to the support ring, such that incremental rotation of the support ring results in incremental orbital movement of the grinding wheel support relative to the movable jaws and lateral adjustment of the grinding wheel support moves the grinding wheel support toward and away from the movable jaws, the laterally adjustable grinding wheel support including a mounting arm having a first end and a second end, an upwardly projecting pin being positioned between the first end and the second end, the first end being pivotally mounted to the support ring, the second end being secured in a guide track on the support ring, movement of the second end of the mounting arm along the guide track moving the upwardly projecting pin toward and away from the movable jaws; and a shield being positioned around a portion of the grinding wheel support.

16. The apparatus for grinding a shank of a drill bit as defined in claim 15, wherein the guides in the top and the bottom of the outer barrel are arcuate slots and the jaws have projecting pins which are engaged in the arcuate slots.

17. The apparatus for grinding a shank of a drill bit as defined in claim 15, a rod being secured to the second end of the mounting arm, gearing being provided to extend and retract the rod, thereby altering moving the second end of the mounting arm along the guide track.

18. The apparatus for grinding a shank of a drill bit as defined in claim 15, wherein a connecting line ties the movement of the locking levers on the two hand grips.

19. The apparatus for grinding a shank of a drill bit as defined in claim 15, wherein the shield includes a cuttings disposal passage.

20. The apparatus for grinding a shank of a drill bit as defined in claim 15, in combination with a grinding wheel rotated by a hand drill, the grinding wheel being supported on the upwardly projecting pin.

21. The apparatus for grinding a shank of a drill bit as defined in claim 15, wherein indicia is marked on the top of the outer barrel indica to aid in selection of a rotational position for the support ring, and the support ring has marked thereon cooperating indicia.

* * * * *